Dec. 30, 1930.  A. S. HOWELL  1,787,198
PHOTOGRAPHIC DEVICE
Filed July 26, 1928  3 Sheets-Sheet 3
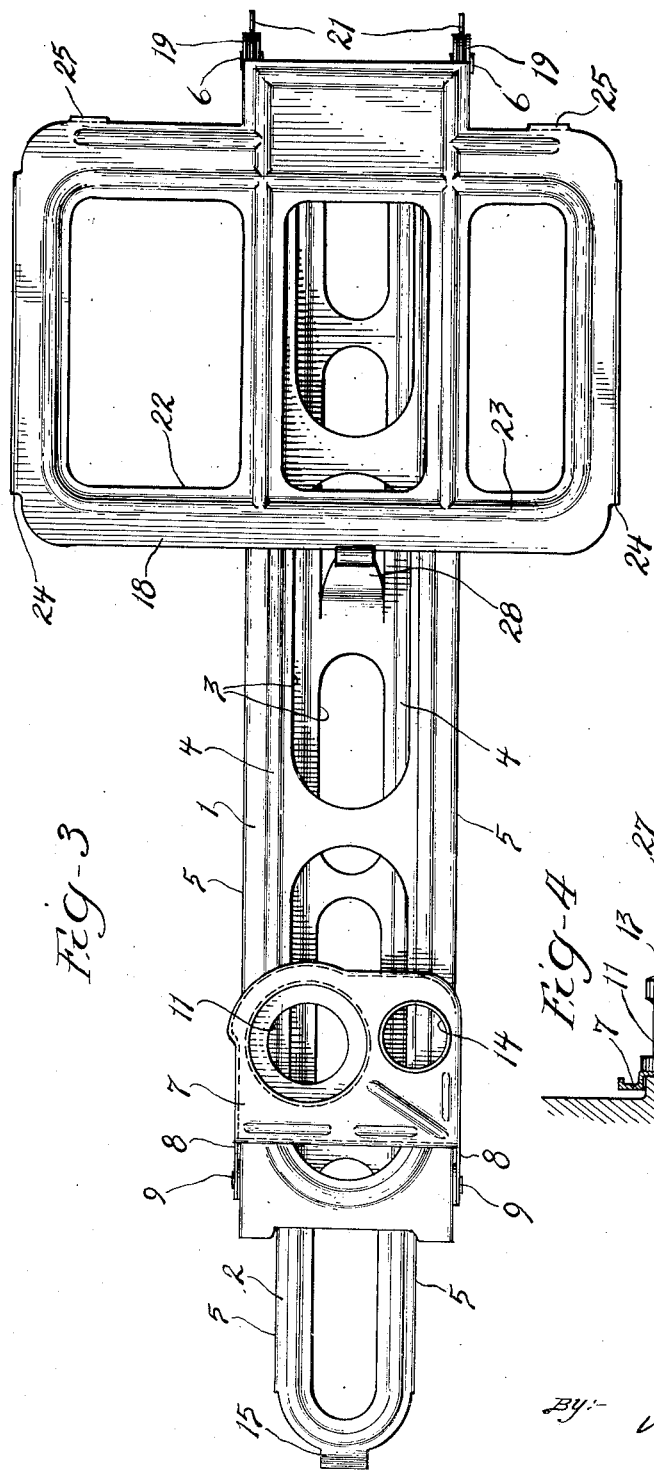
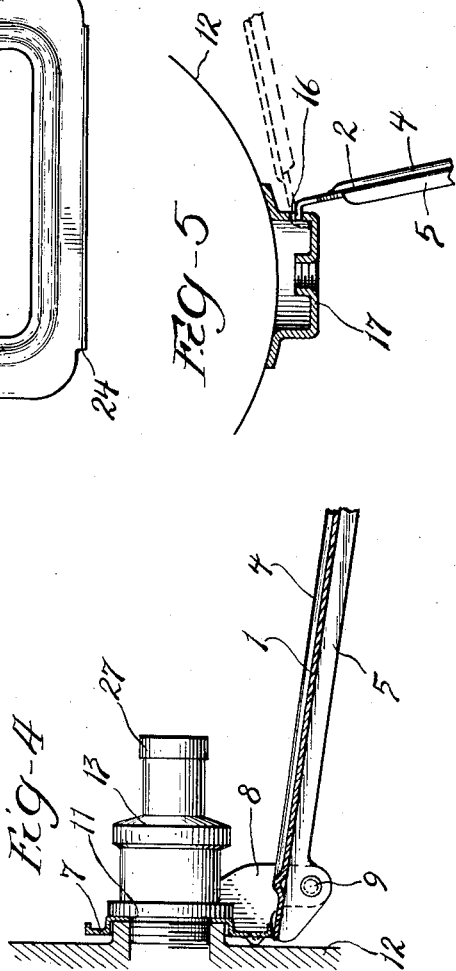
Inventor
Albert S. Howell
By:- Miehle & Miehle,
Attys Patented Dec. 30, 1930

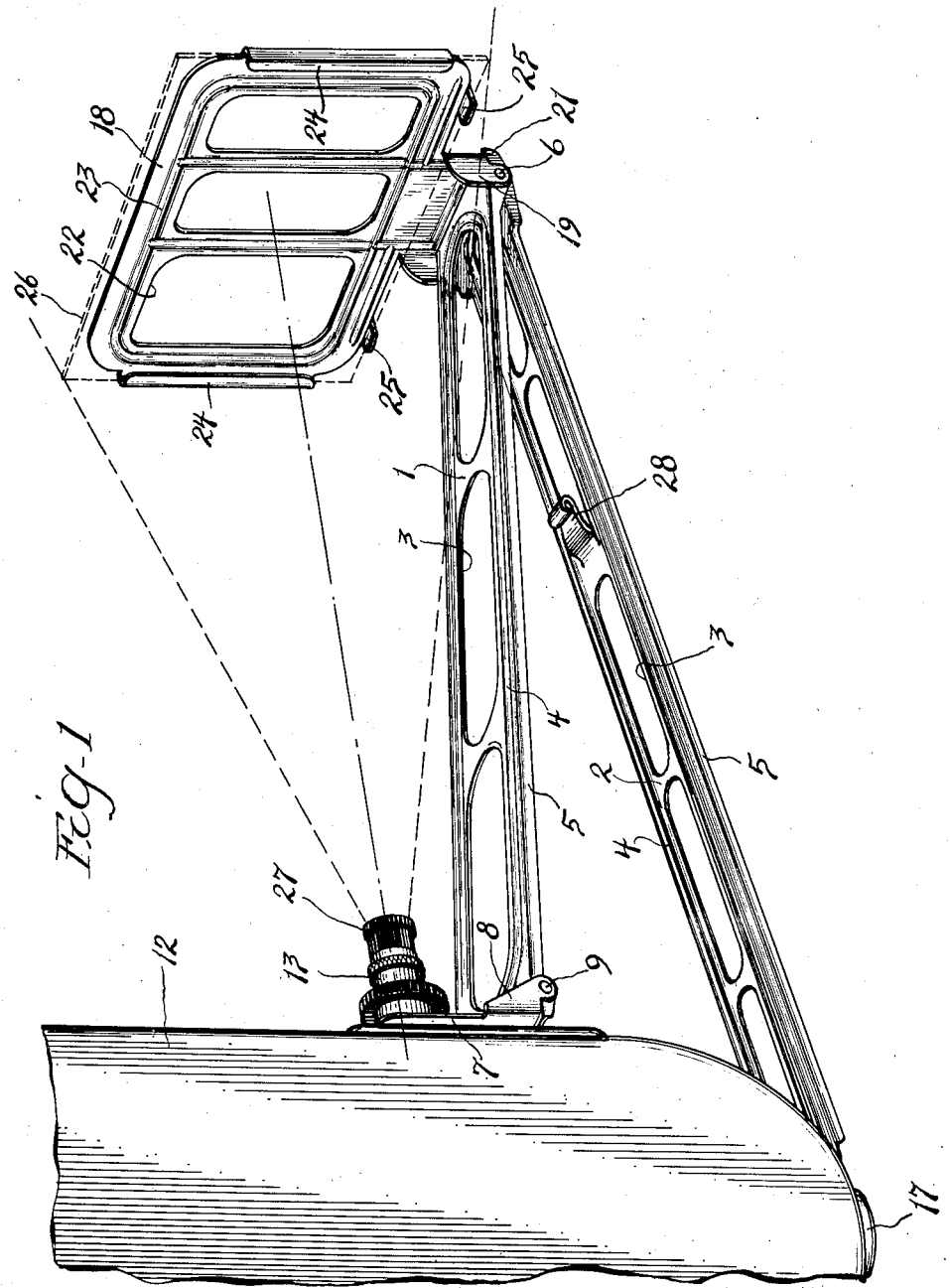

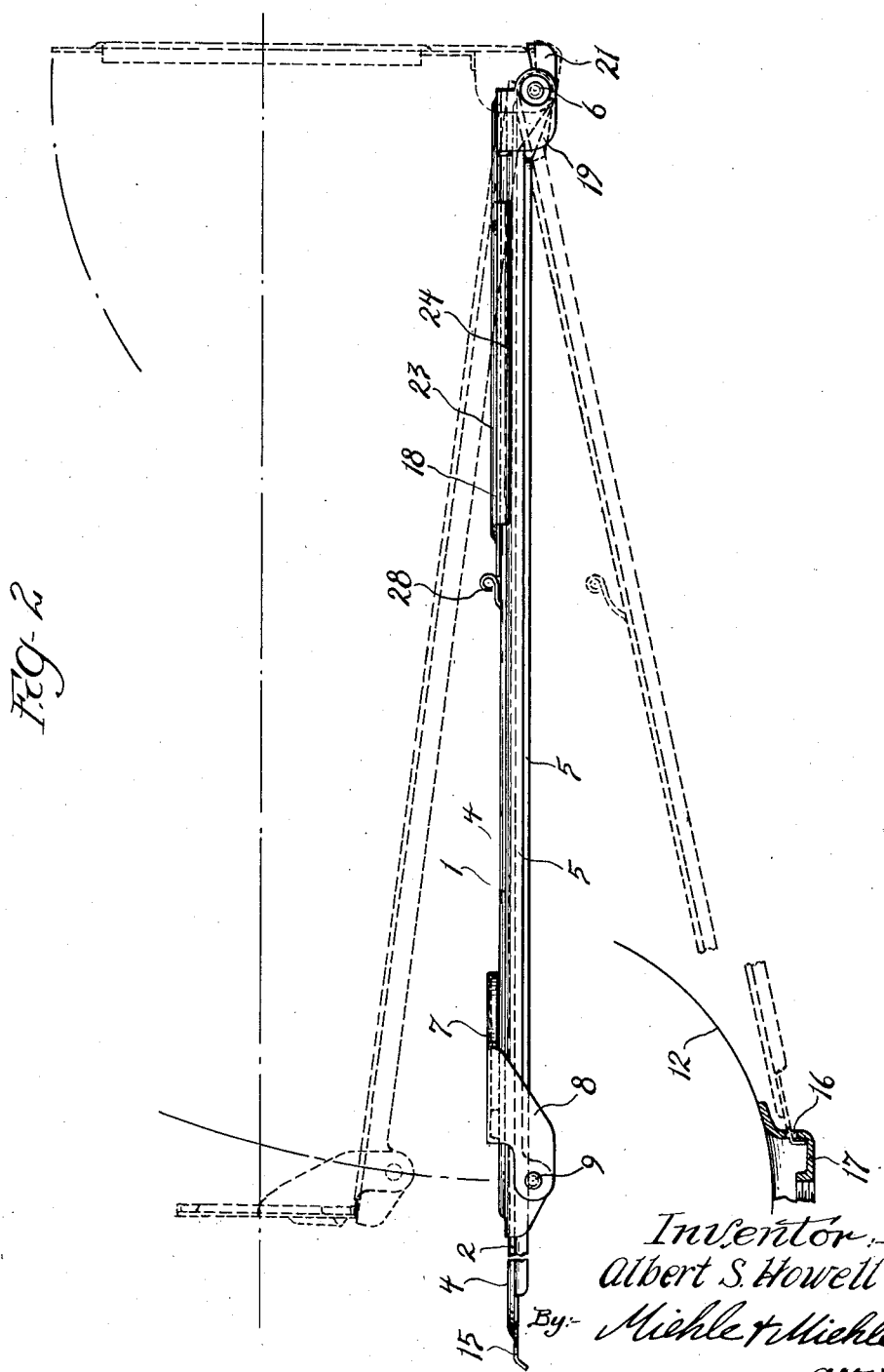

1,787,198

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PHOTOGRAPHIC DEVICE

Application filed July 26, 1928. Serial No. 295,372.

My invention relates particularly to a photographic device for photographing titles on motion picture films although not limited to this use alone, and its general feature relates to the provision of a simple and effective device by means of which titles and other subjects may be photographed in an effective and convenient manner.

Another feature relates to the provision of a device of the above character which is foldable in compact form when not in use, which preferably is made mainly of sheet metal, and which is particularly adapted for a certain well known motion picture camera.

With these features in view my invention consists in certain features of novelty in the construction, combination, and arrangement of parts by which the said features and certain other features are effected, all as fully described with reference to the accompanying drawings and more particularly pointed out in the claims.

In the said drawings:—

Figure 1 is a perspective view of a photographic device of my invention attached to a motion picture camera;

Figure 2 is a side elevation of the device in folded condition, this view also showing the device in open condition by broken lines and showing a sectional view of a portion of the camera, as hereinafter described;

Figure 3 is a plan view of the device in folded condition;

Figure 4 is a sectional view of a portion of the camera and the device; and

Figure 5 is a sectional view of a different portion of the camera and the device.

Like characters of reference indicate like parts in the several views.

Referring to the drawings, 1 designates an upper and 2 a lower extension support member. See Figures 1, 2 and 3. These support members are preferably formed of sheet metal and are intermediately perforated, as designated at 3, for purposes of lightness. These members are also preferably corrugated marginally, as designated at 4, for rigidity, and are provided with flanges 5 at the longitudinal sides thereof for the same purpose and for other purposes hereinafter appearing.

Coaxial headed pivot studs 6 are engaged in apertures of the flanges 5 at ends of the support members 1 and 2 whereby the support members are similarly disposed and angularly movable into and out of overlying relation.

A securing member 7, preferably of sheet metal, is provided with side flanges 8, and coaxial headed pivot studs 9 are engaged in apertures of these flanges and the flanges 5 of the upper support member 1 at the free end thereof, whereby the member 7 is angularly movable into and out of overlying relation with this support member. See Figures 1, 2, 3 and 4.

The member 7 is provided with an aperture 11, see Figure 3, whereby it is detachably secured to a photographic camera 12 by means of the photographic lens 13 of the camera, see Figure 4, the member 7 being provided with another aperture 14, see Figure 3, which registers with the view finder of the camera so that the member 7 does not interfere with the use thereof.

The free end of the lower support member 2 is provided with an angled and shouldered formation 15 which is engageable in an undercut recessed formation at the bottom of the camera, provided by an aperture 16 formed through the wall of a hollow tripod mounting bracket 17 secured to the camera at the bottom thereof. See Figures 1, 2 and 5.

This engagement is effected by engaging the formation 15 in the aperture 16 with the support member 2 in the position shown in full lines in Figure 5, and thereafter tilting the member 2 upwardly to its final attached position as shown in full lines in Figure 1 and in broken lines in Figures 2 and 5.

In the attachment of the device to the camera the lower support member 2 is first attached thereto, as above described, and thereafter the securing member 7 is attached to the camera by means of the photographic lens 13 as before described.

In detaching the device from the camera the securing member 7 is first detached, after which the member 2 is tilted downwardly to detach the same from the camera.

When the device is attached to the camera the free ends of the support members 1 and 2 are vertically spaced, thus giving the members 1 and 2 an angle brace relation with obvious advantage.

As attached to the camera the support members 1 and 2 project forwardly therefrom, and a card holder 18, provided with spaced flanges 19, is pivotally mounted at the outer ends of the support members 1 and 2 for angular movement from overlying relation with said support members into an upright photographing position with respect to the camera by means of the pivot studs 6 engaging in apertures in the flanges 19. See Figures 1, 2 and 3.

Forward extensions 21 of the flanges 5 of the upper support member 1 form stops to predetermine the upright or photographing position of the objective card holder 18. See Figures 1 and 2.

The card holder 18 is preferably formed of sheet metal and is intermediately perforated, as designated at 22, for lightness, and is corrugated, as designated at 23, for rigidity.

The edges of the vertical sides of the card holder are doubled back, as designated at 24, to form slides, and a pair of spaced lugs 25 are formed on the lower edge of the card holder, so that a card 26, shown in broken lines in Figure 1, may be interchangeably mounted on the card holder, the cards being slidably engaged in the slides formed by the doubled back sides 24 of the card holder and the lower edges of the cards engaging the lugs 25 to limit downward movement thereof. Titles or other matter are inscribed or mounted on these cards for the photographing thereof.

In order to properly focus the camera upon a card 26 mounted on the holder 18, the usual photographic lens 13 of the camera is supplemented by an additional lens 27 which is detachably mounted on the outer end of the lens 13 in a usual manner.

When the device is detached from the camera the support members 1 and 2, the securing member 7 and the card holder 18 may be folded into overlying relation, thus rendering the device very compact for purposes of carrying and storage.

A latch formation 28 is struck up from the intermediate portion of the lower support member 2 for releasable engagement with the upper edge portion of the card holder 18 for retaining the support members and card holder in overlying relation.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination of two similarly disposed extension support members pivotally secured together for movement into and out of overlying relation, means whereby corresponding free ends of said members may be detachably and predeterminately secured in spaced relation to a photographic camera, a card holder pivotally secured with said support members in spaced relation with said free ends thereof for movement from an overlying relation with respect to said support members into a predetermined photographing position with respect to the camera, and releasable means for securing said support members and card holder in overlying relation.

2. In a device of the character described the combination of two sheet metal extension support members provided with flanges at the longitudinal sides thereof, pivot means engaged in apertures in said flanges at ends of said support members whereby the support members are angularly movable into and out of overlying relation, means whereby the free ends of said support members are predeterminately and detachably secured in vertically spaced relation to a photographic camera, and a card holder of sheet metal engaged on said pivot means for angular movement from overlying relation with said support members into photographing position with respect to the camera.

3. In a device of the character described the combination of two sheet metal extension support members provided with flanges at the longitudinal sides thereof, pivot means engaged in apertures in said flanges at ends of said support members whereby the support members are angularly movable into and out of overlying relation, a sheet metal securing member provided with an aperture whereby the securing member is detachably secured to a photographic camera by means of the photographic lens thereof and provided with side flanges, a second pivot means engaged in apertures in the flanges of one of said support members at the free end thereof and with apertures in the flanges of said securing member whereby the securing member is angularly movable into and out of overlying relation with this support member, means whereby the free end of the other support member is predeterminately and detachably secured to the camera in vertically spaced relation with the first mentioned support member, and a card holder of sheet metal provided with spaced flanges in apertures of which said first mentioned pivot means is engaged for angular movement of the card holder from overlying relation with said support members into photographing position with respect to the camera.

4. In a device of the character described the combination of two sheet metal extension support members provided with flanges at the longitudinal sides thereof, pivot means engaged in apertures in said flanges at ends of said support members whereby the support members are angularly movable into and out of overlying relation, a sheet metal securing member provided with an aperture whereby the securing member is detachably secured to a photographic camera by means of the photographic lens thereof and provided with side flanges, a second pivot means engaged in apertures in the flanges of one of said support members at the free end thereof and with apertures in the flanges of said securing member whereby the securing member is angularly movable into and out of overlying relation with this support member, an angled and shouldered formation at the free end of the other support member whereby to engage with an undercut recessed formation at the bottom of the camera to detachably secure this support member with the camera, a card holder of sheet metal provided with spaced flanges in apertures of which said first mentioned pivot means is engaged for angular movement of the card holder from overlying relation with said support members into photographing position with respect to the camera, and a latch formation struck up from the intermediate portion of one of said support members for releasable engagement with said card holder for retaining said support members and card holder in overlying relation.

In witness whereof I hereunto affix my signature this 24th day of July, 1928.

ALBERT S. HOWELL.